United States Patent
Yiu et al.

(10) Patent No.: US 9,560,560 B2
(45) Date of Patent: Jan. 31, 2017

(54) USER EQUIPMENT AND METHODS FOR HANDOVER USING MEASUREMENT REPORTING BASED ON MULTIPLE EVENTS

(71) Applicant: Intel IP Corporation, Santa Clara, CA (US)

(72) Inventors: Candy Yiu, Portland, OR (US); Yujian Zhang, Beijing (CN); Youn Hyoung Heo, Seoul (KR); Mo-Han Fong, Sunnyvale, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/578,961

(22) Filed: Dec. 22, 2014

(65) Prior Publication Data

US 2015/0312818 A1 Oct. 29, 2015

Related U.S. Application Data

(60) Provisional application No. 61/985,350, filed on Apr. 28, 2014.

(51) Int. Cl.
*H04W 36/00* (2009.01)

(52) U.S. Cl.
CPC .................. *H04W 36/0094* (2013.01)

(58) Field of Classification Search
CPC .................................................. H04W 36/0094
See application file for complete search history.

(56) References Cited

U.S. PATENT DOCUMENTS

| 2008/0299927 | A1 | 12/2008 | Tenbrook et al. |
| 2011/0176430 | A1 | 7/2011 | Zetterberg et al. |
| 2011/0281587 | A1 | 11/2011 | Jokinen et al. |
| 2012/0275315 | A1* | 11/2012 | Schlangen ............ H04W 24/02 370/242 |
| 2013/0058245 | A1* | 3/2013 | Van Lieshout ... H04W 36/0083 370/252 |
| 2013/0084809 | A1 | 4/2013 | Johansson et al. |

(Continued)

FOREIGN PATENT DOCUMENTS

WO WO-2015167697 A1 11/2015

OTHER PUBLICATIONS

3GPP TS 36.331 v10.2.0. Jun. 2011. pp. 81-88.*

(Continued)

*Primary Examiner* — Nathan Mitchell
(74) *Attorney, Agent, or Firm* — Schwegman Lundberg & Woessner, P.A.

(57) ABSTRACT

Embodiments of a User Equipment (UE) to support inter-frequency handover are disclosed herein. The UE may receive, from an Evolved Node-B (eNB), a measurement report configuration message that includes multiple measurement events to be determined at the UE. The UE may transmit a measurement report when a combined measurement event occurs. The combined measurement event may include a combination of the multiple measurement events according to a "logical AND" operator such that the combined measurement event occurs when the multiple measurement events occur. The measurement events may be related to signal measurements performed on one or more signals received at the UE from one or more cells configured for operation in the network.

25 Claims, 8 Drawing Sheets

(56) References Cited

U.S. PATENT DOCUMENTS

| | | | | |
|---|---|---|---|---|
| 2013/0109380 A1* | 5/2013 | Centonza | .......... | H04W 36/0083 455/434 |
| 2013/0267221 A1* | 10/2013 | Srinivasan | ........ | H04W 36/0088 455/422.1 |
| 2013/0288742 A1* | 10/2013 | Yao | ...................... | H04J 11/0023 455/553.1 |
| 2013/0303168 A1* | 11/2013 | Aminzadeh Gohari | .............. | H04W 36/0083 455/436 |
| 2015/0358838 A1* | 12/2015 | Wei | ....................... | H04W 24/04 370/228 |
| 2016/0044569 A1* | 2/2016 | Lunden | ................ | H04W 36/32 370/331 |

OTHER PUBLICATIONS

International Application Serial No. PCT/US2015/022169, International Search Report mailed Jul. 3, 2015, 3 pgs.
International Application Serial No. PCT/US2015/022169, Written Opinion mailed Jul. 3, 2015, 7 pgs.

* cited by examiner

USER EQUIPMENT AND METHODS FOR HANDOVER USING MEASUREMENT REPORTING BASED ON MULTIPLE EVENTS

PRIORITY CLAIM

This application claims priority under 35 USC 119(e) to U.S. Provisional Patent Application Ser. No. 61/985,350 filed Apr. 28, 2014 [reference number P67002Z (4884.175PRV)], which is incorporated herein by reference in its entirety.

TECHNICAL FIELD

Embodiments pertain to wireless communications. Some embodiments relate to cellular communication networks including LTE networks. Some embodiments relate to handover, including inter-frequency handover. Some embodiments relate to measurement reporting, especially measurement reporting based on multiple events.

BACKGROUND

A mobile device may operate in a cellular network configured with a macro-cell overlay of base stations along with additional micro-cells that may offer increased capacity or throughput in small areas. Various performance measurements, such as received signal quality or level, may be performed at the mobile device or at the base stations in order to assist in handover decisions. In some scenarios, interference may affect such measurements in an unexpected manner, which may result in handovers that are unfavorable for the mobile device and/or the network. As an example, when clusters of micro-cells are deployed, interference may skew signal quality measurements. Accordingly, there are general needs for systems and methods of performance measurement that enable handovers in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
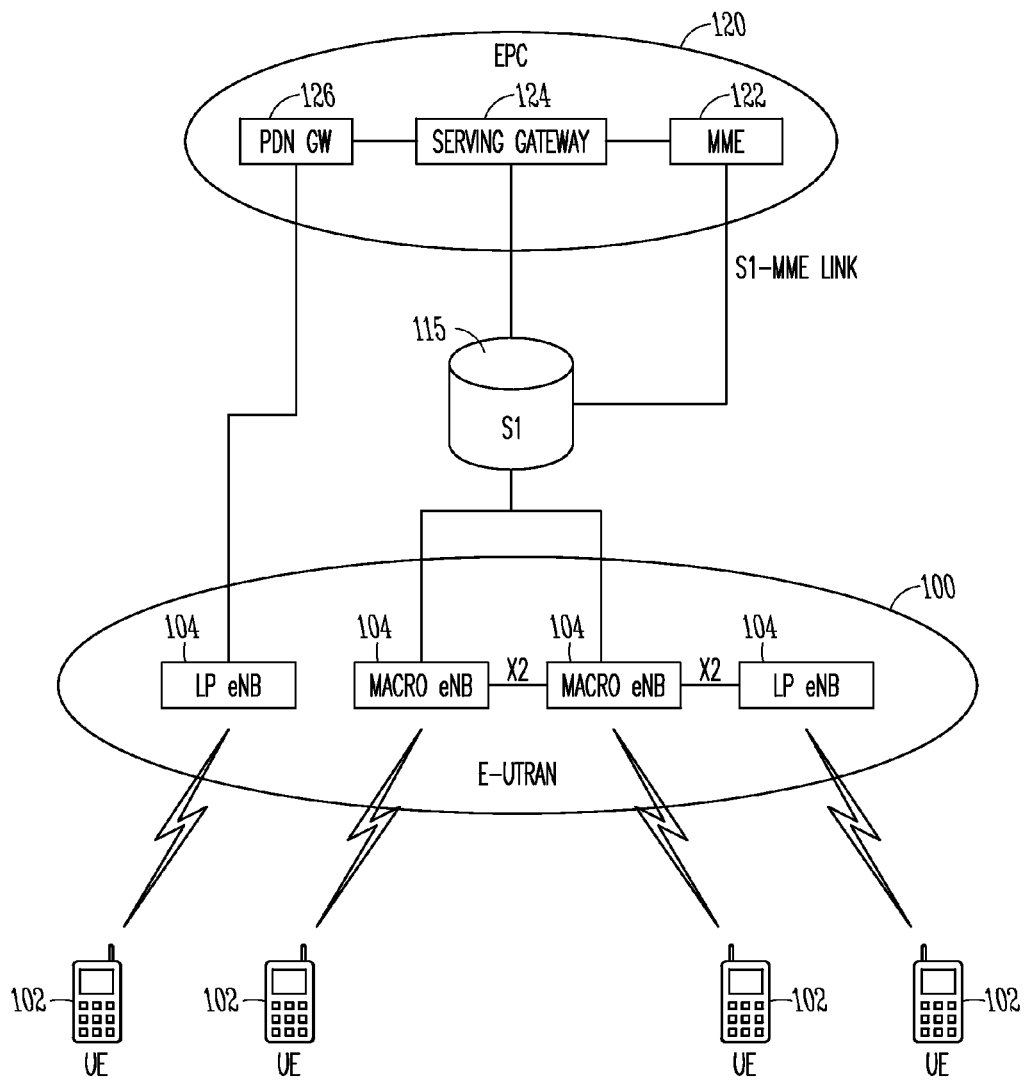
FIG. 1 is a functional diagram of a 3GPP network in accordance with some embodiments.

FIG. 1 is a functional diagram of a 3GPP network in accordance with some embodiments. The network comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes mobility management entity (MME) 122, serving gateway (serving GW) 124, and packet data network gateway (PDN GW) 126. The RAN 100 includes Evolved Node-B's (eNBs) 104 (which may operate as base stations) for communicating with User Equipment (UE) 102. The eNBs 104 may include macro eNBs and low power (LP) eNBs. The UE 102 may receive, from the eNB 104, a measurement report configuration message that includes multiple measurement events to be determined at the UE 102 as part of a potential handover process. The measurement events may be related to signal measurements performed on one or more signals received at the UE 102 from eNBs 104 operating in one or more cells configured for operation in the network The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 104 to a UE 102, while uplink transmission from the UE 102 to the eNB 104 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements and in the frequency domain and may represent the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE 102 about the transport format, resource allocation, and H-ARQ information related to the uplink shared channel. Typically, downlink scheduling (assigning control and shared channel resource blocks to UEs 102 within a cell) is performed at the eNB 104 based on channel quality information fed back from the UEs 102 to the eNB 104, and then the downlink resource assignment information is sent to a UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

Figure 2:
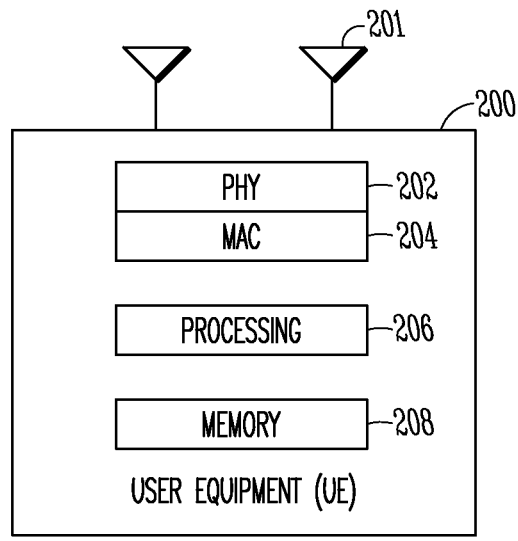
FIG. 2 is a functional diagram of a User Equipment (UE) in accordance with some embodiments.
Figure 3:
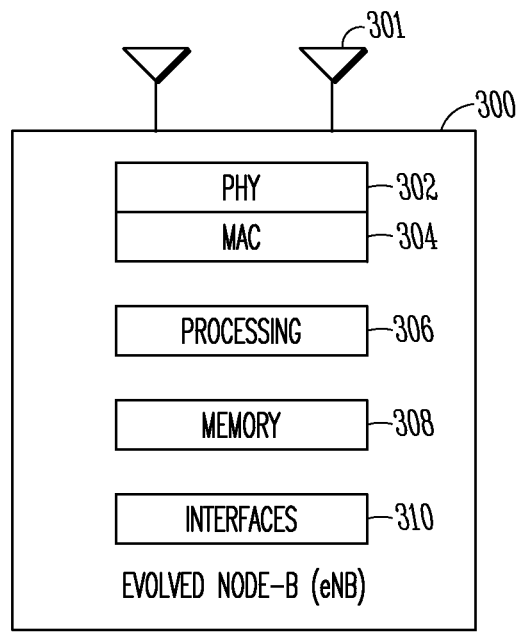
FIG. 3 is a functional diagram of an Evolved Node-B (eNB) in accordance with some embodiments.

FIG. 2 is a functional diagram of a User Equipment (UE) in accordance with some embodiments. FIG. 3 is a functional diagram of an Evolved Node-B (eNB) in accordance with some embodiments. It should be noted that in some embodiments, the eNB 300 may be a stationary non-mobile device. The UE 200 may be a UE 102 as depicted in FIG. 1, while the eNB 300 may be an eNB 104 as depicted in FIG. 1. The UE 200 may include physical layer circuitry 202 for transmitting and receiving signals to and from the eNB 300, other eNBs, other UEs or other devices using one or more antennas 201, while the eNB 300 may include physical layer circuitry 302 for transmitting and receiving signals to and from the UE 200, other eNBs, other UEs or other devices using one or more antennas 301. The UE 200 may also include medium access control layer (MAC) circuitry 204 for controlling access to the wireless medium, while the eNB 300 may also include medium access control layer (MAC) circuitry 304 for controlling access to the wireless medium. The UE 200 may also include processing circuitry 206 and memory 208 arranged to perform the operations described herein, and the eNB 300 may also include processing circuitry 306 and memory 308 arranged to perform the operations described herein. The eNB 300 may also include one or more interfaces 310, which may enable communication with other components, including other eNBs 104 (FIG. 1), components in the EPC 120 (FIG. 1) or other network components. In addition, the interfaces 310 may enable communication with other components that may not be shown in FIG. 1, including components external to the network. The interfaces 310 may be wired or wireless or a combination thereof.

The antennas 201, 301 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201, 301 may be effectively separated to take advantage of spatial diversity and the different channel characteristics that may result.

In some embodiments, mobile devices or other devices described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the mobile device or other device can be a UE or an eNB configured to operate in accordance with 3GPP standards. In some embodiments, the mobile device or other device may be configured to operate according to other protocols or standards, including IEEE 802.11 or other IEEE standards. In some embodiments, the mobile device or other device may include one or more of a keyboard, a display, a non-volatile memory port, multiple antennas, a graphics processor, an application processor, speakers, and other mobile device elements. The display may be an LCD screen including a touch screen.

Although the UE 200 and eNB 300 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

In accordance with embodiments, the UE 102 may support inter-frequency handover, and may receive a measurement report configuration message from the eNB 104. The message may include multiple measurement events to be determined at the UE 102. The UE 102 may transmit a measurement report when a combined measurement event occurs. The combined measurement event may include a combination of the multiple measurement events according to a "logical AND" operator such that the combined measurement event occurs when the multiple measurement events occur. The measurement events may be related to signal measurements performed on one or more signals received at the UE 102 from one or more cells configured for operation in the network. These embodiments are described in more detail below.

Figure 4:
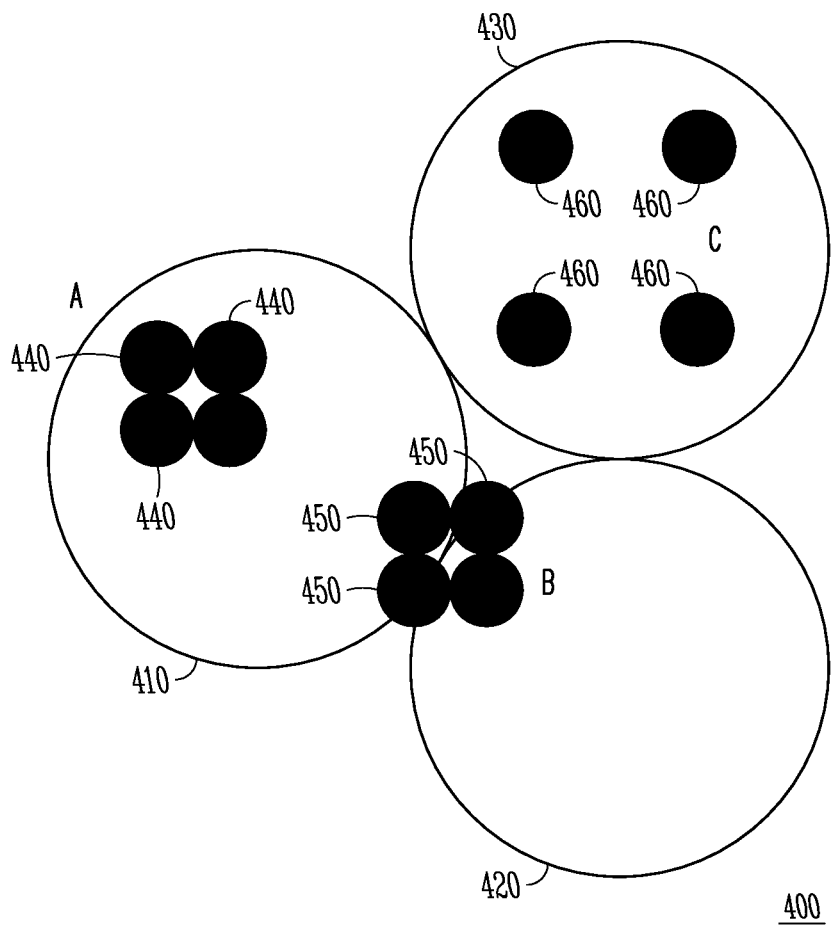
FIG. 4 illustrates an example of a scenario in which a macro-cell overlay and multiple micro-cells are deployed in accordance with some embodiments.

FIG. 4 illustrates an example of a scenario in which a macro-cell overlay and multiple micro-cells are deployed in accordance with some embodiments. In some cases, a micro-cell may be similar to a pico-cell or femto-cell described earlier, and may be served by a micro eNB 104 (FIG. 1) as also described earlier. In addition, a macro-cell may be served by a macro eNB 104 (FIG. 1) as described earlier, in some cases. It should be noted that embodiments are not limited by the example scenario 400 shown in FIG. 4 in terms of the number of macro-cells, micro-cells or clusters or in terms of the layout or other geographical aspects shown. In the scenario 400, the macro-cell overlay includes three cells 410, 420, 430. In addition, micro-cells 440 are deployed as a "cluster" within the macro-cell 410, while micro-cells 450 are deployed as a cluster on the border of coverage of the macro-cells 410, 420. Micro-cells 460 are deployed within the macro-cell 430 in a "non-cluster" deployment. Accordingly, a cluster may refer to a group of small cells that may overlap or may be located within a small distance of each other in comparison to the radius of a macro-cell. A non-cluster may refer to a group of small cells that are non-overlapping or are spaced apart by a distance that is not significantly smaller than the macro-cell radius.

In some embodiments, the macro-cells may use a frequency band that is different from frequency bands used by the micro-cells. A UE 102 (FIG. 1) operating in the network shown in FIG. 4 may monitor different cells (macro and micro) in order to determine whether to handover or to determine whether to transmit a measurement report to one or more eNBs 104 for assistance in a handover decision. The report may include information related to signal quality, signal level or other performance measurements determined at the UE 102. As an example, Reference Signal Received Quality (RSRQ) or Reference Signal Received Quality (RSRP) measurements from 3GPP or other standards may be used. The RSRQ may be a better choice than RSRP for inter-frequency scenarios in terms of measurement error or other metrics. In addition, other considerations may affect the RSRQ and RSRP measurements, such as whether or not small cells are deployed as a cluster or as a non-cluster. Accordingly, in some deployments, usage of RSRQ and/or RSRP measurements may need to be performed carefully in order to avoid or mitigate unfavorable handover scenarios. For instance, a cluster of small cells may experience higher interference than a non-cluster, which may result in a lower RSRQ for the cluster. While the UE 102 may be physically closer to the cluster, the measurement reported to the eNB 104 or other base station may be misleading. In addition, the measurement report for that RSRQ may be triggered unnecessarily, and system resources may be wasted in the transmission of such over-the-air traffic.

Figure 5:
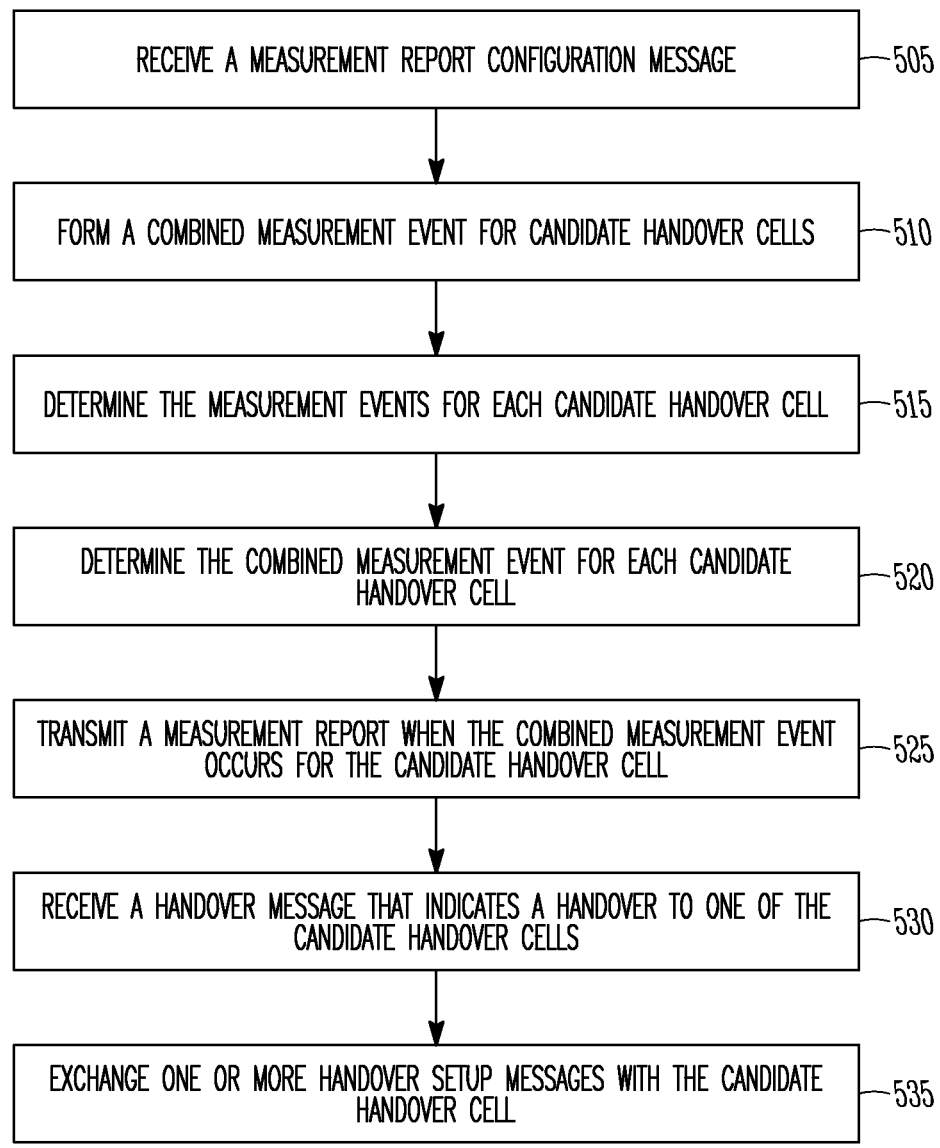
FIG. 5 illustrates the operation of a method for supporting inter-frequency handover in accordance with some embodiments.

FIG. 5 illustrates the operation of a method for supporting inter-frequency handover in accordance with some embodiments. In some embodiments, the handover may occur between a macro cell that operates in a first frequency band and a micro cell that operates in a second different frequency band. In some embodiments, the micro cell may be included in a cluster of micro cells that operates in the second frequency band. Embodiments are not limited to these configurations, however, and some or all of the techniques and operations described herein may be applied to systems or networks that exclusively use macro-cells or micro-cells. In addition, embodiments are also not limited to inter-frequency handovers.

It is important to note that embodiments of the method 500 may include additional or even fewer operations or processes in comparison to what is illustrated in FIG. 5. In addition, embodiments of the method 500 are not necessarily limited to the chronological order that is shown in FIG. 5. In describing the method 500, reference may be made to FIGS. 1-4 and 6-9, although it is understood that the method 500 may be practiced with any other suitable systems, interfaces and components. For example, reference may be made to the scenario 400 in FIG. 4 described earlier for illustrative purposes, but the techniques and operations of the method 500 are not so limited.

In addition, while the method 500 and other methods described herein may refer to eNBs 104 or UEs 102 operating in accordance with 3GPP or other standards, embodiments of those methods are not limited to just those eNBs 104 or UEs 102 and may also be practiced by other mobile devices, such as a Wi-Fi access point (AP) or user station (STA). Moreover, the method 500 and other methods described herein may be practiced by wireless devices configured to operate in other suitable types of wireless communication systems, including systems configured to operate according to various IEEE standards such as IEEE 802.11.

At operation 505 of the method 500, a measurement report configuration message may be received at the UE 102. In some embodiments, the measurement report configuration message may include multiple measurement events to be determined at the UE 102 for candidate handover cells. The measurement events may be related to signal measurements, such as RSRQ or RSRP or other, performed on one or more signals received at the UE 102 from one or more cells configured for operation in the network. As an example, the measurement events may be based at least partly on signal measurements at the UE 102 for a serving cell or for a candidate handover cell.

The combined measurement event may include a combination of the multiple measurement events according to a "logical AND" operator such that the combined measurement event occurs when the multiple measurement events occur. In addition, the measurement report configuration message may further include one or more logical operators, such as the "logical AND" just described, which may be used at operation 510 to form the combined measurement event for each of the candidate handover cells. Accordingly, an occurrence of the combined measurement event may be based on occurrences of the measurement events. In some embodiments, the combined measurement event may be related to a joint occurrence of the measurement events and the measurement report configuration message may include an event relationship operator to indicate that the combined measurement event is related to the joint occurrence of the measurement events according to a "logical AND" operator.

In some embodiments, a measurement event may occur when an RSRQ, RSRP or other signal measurement or performance measurement takes on a particular value or a value in a particular range. Accordingly, measurement events for each candidate handover cell may be based at least partly on signals received, at the UE 102, from the candidate handover cell. The determination of measurement events, or the determination that a measurement event occurs, may include a comparison of an RSRQ or RSRP with a threshold or with another RSRQ or RSRP, in some embodiments.

In some embodiments, an occurrence of a measurement event may be related to a difference between a signal measurement result and a predetermined threshold. In some embodiments, an occurrence of a measurement event may be related to a difference between signal measurement results for the measurement event. The signal measurement results may be related to signals received from a serving cell and a candidate handover cell.

As an example, the measurement event may occur when the signal measurement result is above or below a threshold or is above or below another value, such as another signal measurement result. As another example, a difference between the signal measurement result and a threshold or other value may exceed a predetermined difference threshold. For instance, a measurement event may occur when an RSRQ exceeds a target RSRQ for acceptable performance by a certain amount, such as 3 dB or other value.

In some embodiments, the logical operators may be selected from a group of candidate logical operators that includes "logical AND" and "logical OR" but are not limited as such. As an example, the measurement report configuration message may include a first measurement event, a second measurement event, and a "logical AND" operator, and a combined measurement event may occur when the first and second measurement events occur. Other logical operators, including "logical NAND" or "logical NOR" or "logical NOT" or others may also be used in some embodiments.

Several example embodiments of a measurement report configuration message will be presented below in FIGS. 6-9. It should be noted that these examples are presented for illustration of concepts described herein, but embodiments are not limited to the order in which parameters or information are presented or to any other presentation aspects, such as syntax or naming conventions. For instance, in some embodiments, a syntax or programming language associated with a standard, such as 3GPP or other, may be used. Some embodiments may include some or all parameters or information presented in one or more of these examples, and may include additional parameters or information not shown or described. In addition, while the examples illustrate a ReportConfigEUTRA Information Element (IE) used in 3GPP standards, the measurement report configuration message is not limited as such, and may be another message of 3GPP, a message used in other standards or a message used independently of such standards in some embodiments.

Figure 6:
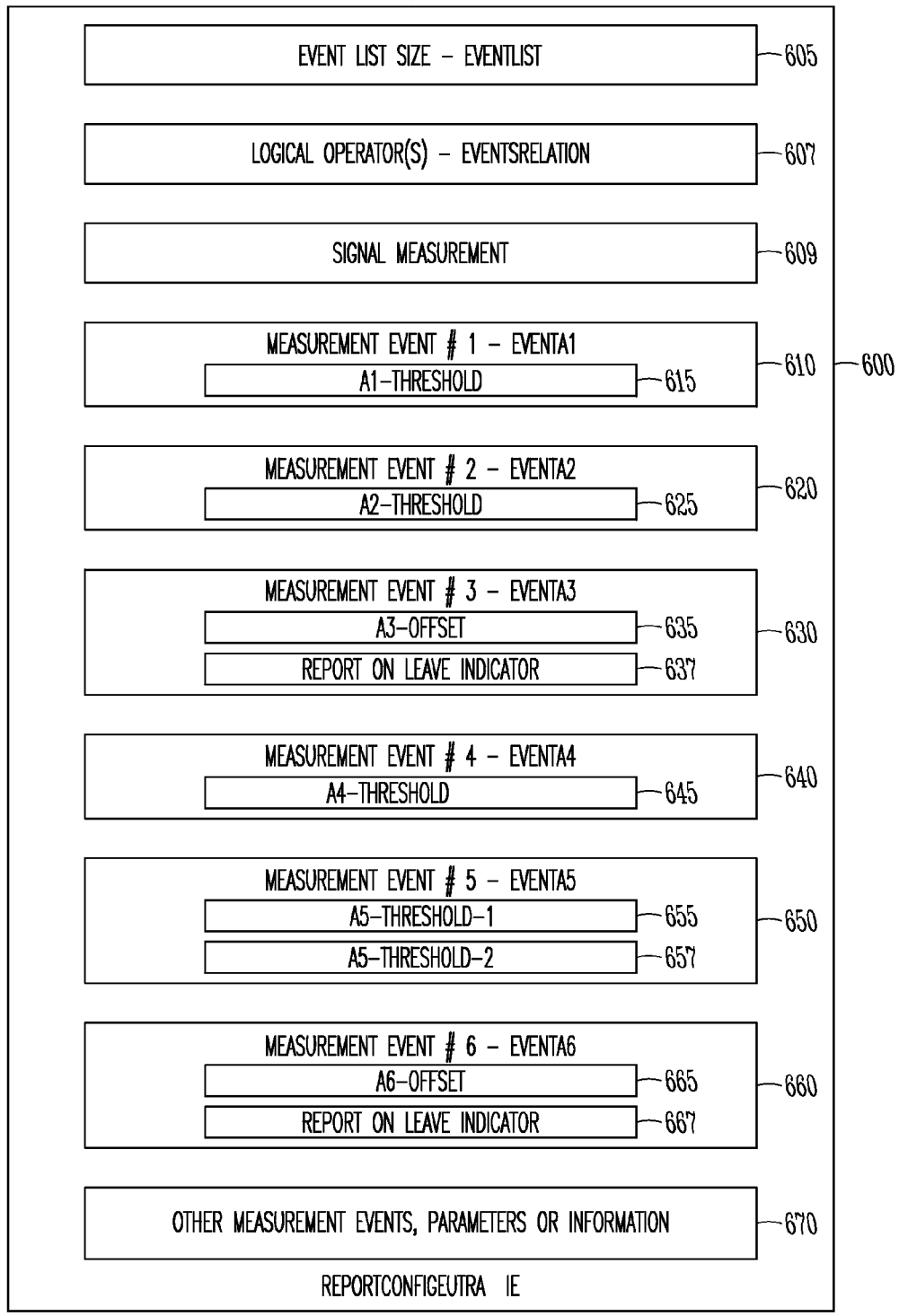
FIG. 6 illustrates an example of a measurement report configuration message in accordance with some embodiments.

FIG. 6 illustrates an example of a measurement report configuration message in accordance with some embodiments. The measurement report configuration message 600 may include an event list size 605, which may be an "eventList" parameter or other used in 3GPP or other standards. The event list size 605 may describe how many measurement events or which measurement events are included in the message 600 and may also include other related information. The message 600 may also include one or more logical operators 607, which may enable combining of measurement events into a combined event for use as a measurement report trigger. As an example, a logical operator 607 may be an "eventsRelation" parameter used in 3GPP or other standards. As previously described, the logical operators 607 may take on values such as "logical AND" or "logical OR" or other suitable values. When the value of "logical AND" is used, a measurement report for a particular candidate handover cell may be triggered when all of the included measurement events occur for that candidate handover cell. When the value of "logical OR" is used, a measurement report for a particular candidate handover cell may be triggered when at least one of the included measurement events occurs for that candidate handover cell. Accordingly, the triggering of a measurement report may occur less frequently when the value of "logical AND" is used than when the value of "logical OR" is used, as the "logical AND" operator is more restrictive. As a result, fewer handover attempts may be made and/or fewer measurement reports may be sent over the air by the UE 102.

The message 600 may also include a signal measurement 609 that may indicate a quantity that is to be measured for the measurement events. In some embodiments, the signal measurement 609 may be selected from a group that includes RSRQ and RSRP, but is not so limited. It should be noted that the signal measurement 609 may also be referred to or may be the same as a "trigger quantity" or other terminology used in 3GPP or other standards.

The measurement report configuration message 600 may include any number of measurement events, such as 610, 620, 630, 640, 650, and 660. In this non-limiting example, those events correspond to events A1-A6, respectively, used in 3GPP standards. Accordingly, various other parameters associated with those events, such as thresholds and offsets, may also be included in the message 600. Those events will be described below for illustrative purposes, but it should be noted that the measurement report configuration message 600 is not limited to these or other 3GPP events.

The first measurement event 610 is an A1 event, and a corresponding a1-Threshold 615 may be included for use in the measurement event 610. Accordingly, the measurement event 610 may occur when a signal measurement result associated with a serving cell is better than the a1-Threshold 615. As an example, the included signal measurement 609 may be RSRQ, and the measurement event 610 may occur when a measured RSRQ for the serving cell is greater than the a1-Threshold 615.

The second measurement event 620 is an A2 event, and a corresponding a2-Threshold 625 may be included for use in the measurement event 620. Accordingly, the measurement event 620 may occur when a signal measurement result associated with a serving cell is worse than the a2-Threshold 625. As an example, the included signal measurement 609 may be RSRQ, and the measurement event 620 may occur when a measured RSRQ for the serving cell is less than the a1-Threshold 625.

The third measurement event 630 is an A3 event, and a corresponding a3-Offset 635 may be included for use in the measurement event 630. Accordingly, the measurement event 630 may occur when a signal measurement result associated with a neighbor cell (or candidate handover cell) is better than a signal measurement result associated with a primary cell (or serving cell) by a difference of at least the a3-Offset 635. A "report on leave" indicator 637 may also be included for the third measurement event 630, which may trigger measurement reporting when a corresponding leave condition is met.

The fourth measurement event 640 is an A4 event, and a corresponding a4-Threshold 645 may be included for use in the measurement event 640. Accordingly, the measurement event 640 may occur when a signal measurement result associated with a neighbor cell (or candidate handover cell) is better than the a4-Threshold 645. As an example, the included signal measurement 609 may be RSRQ, and the measurement event 640 may occur when a measured RSRQ for the neighbor cell is greater than the a4-Threshold 645.

The fifth measurement event 650 is an A5 event, and corresponding "a5-Threshold-1" 655 and "a5-Threshold-2" 657 may be included for use in the measurement event 650. Accordingly, the measurement event 650 may occur when a signal measurement result associated with the primary cell (or serving cell) is worse than the "a5-Threshold-1" 655 and a signal measurement result associated with a neighbor cell (or candidate handover cell) is better than the "a5-Threshold-2" 657. As an example, the included signal measurement 609 may be RSRQ, and the measurement event 650 may occur when a measured RSRQ for the primary cell is less than the "a5-Threshold-1" 655 and a measured RSRQ for the neighbor cell is greater than the "a5-Threshold-2" 657.

The sixth measurement event 660 is an A6 event, and a corresponding a6-Offset 665 may be included for use in the measurement event 660. Accordingly, the measurement event 660 may occur when a signal measurement result associated with a neighbor cell (or candidate handover cell) is better than a signal measurement result associated with a secondary cell (or serving cell) by a difference of at least the a6-Offset 665. A "report on leave" indicator 667 may also be included for the third measurement event 660, which may trigger measurement reporting when a corresponding leave condition is met.

In addition, other measurement events, parameters or information 670 may be included in the measurement report configuration message 600. As an example, measurement events different than those described previously may be used, and may relate to any suitable performance measurements taking on values in a range that may be defined according to threshold, offsets or other numbers. Such measurements may be associated with serving cells, neighbor cells, primary cells, secondary cells or candidate handover cells. As another example, timer values or hysteresis values may indicate time durations over which a condition must be met in order for the measurement event to have occurred.

Figure 7:
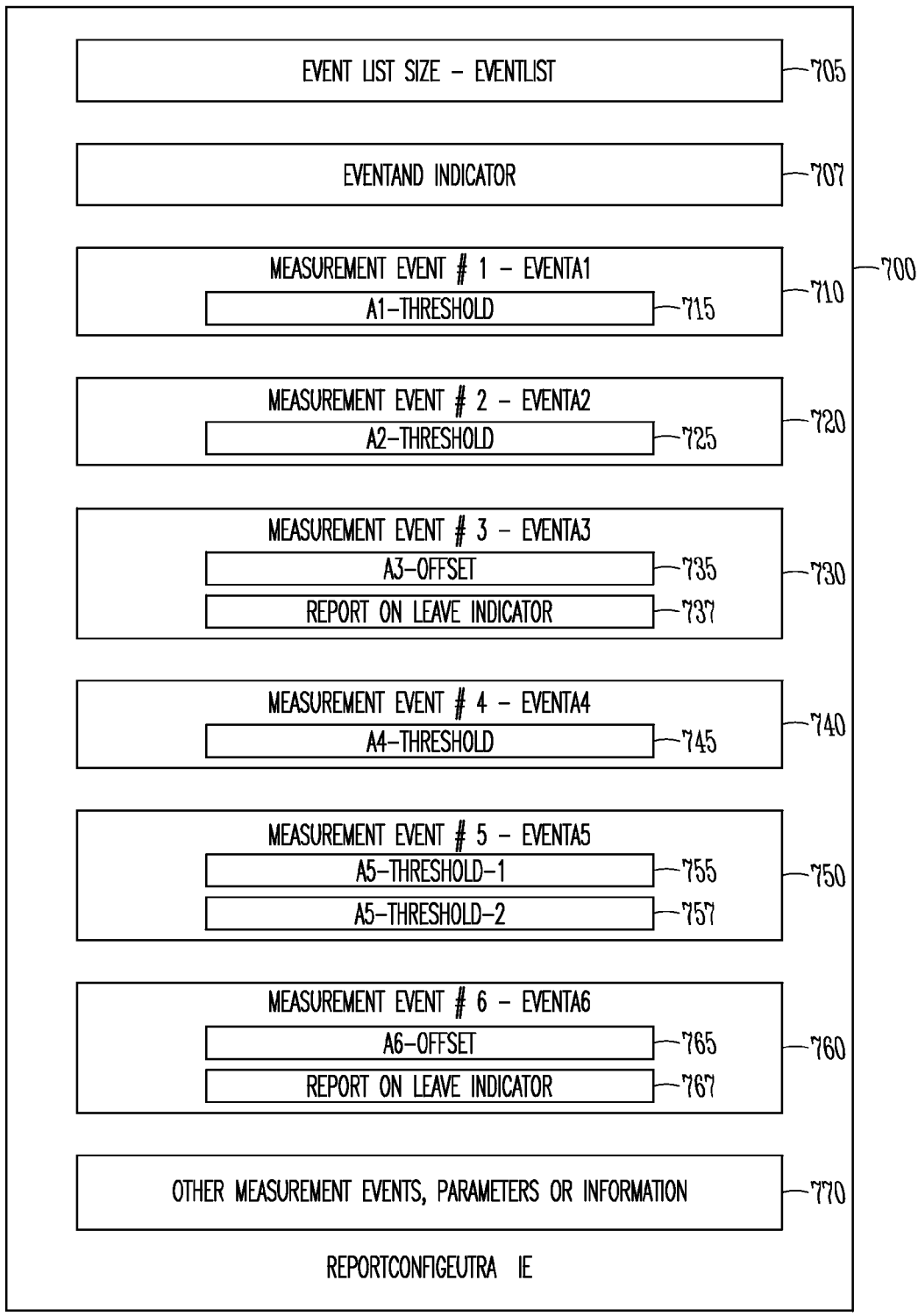
FIG. 7 illustrates another example of a measurement report configuration message in accordance with some embodiments.

FIG. 7 illustrates another example of a measurement report configuration message in accordance with some embodiments. The measurement report configuration message 700 may include an event list size 705, which may be similar to the previously described parameter shown in FIG. 6. The message 700 may also include an "eventAnd indicator" 607 which may be a logical operator that indicates that the combined measurement event is to be formed by applying a "logical AND" operation to the included measurement events. Accordingly, the combined measurement event may occur when all of the included measurement events occur. In addition, any number of measurement events, such as 710, 720, 730, 740, 750, 760, and others, may be used as previously described regarding FIG. 6. Other measurement events, parameters or information 770 may also be included and may be similar to those previously described regarding FIG. 6.

As previously described regarding the usage of the measurement report configuration message 600 shown in FIG. 6, the "logical AND" operator included in the measurement report configuration message 700 may result in fewer handover attempts and/or fewer measurement reports being sent by the UE 102.

Figure 8:
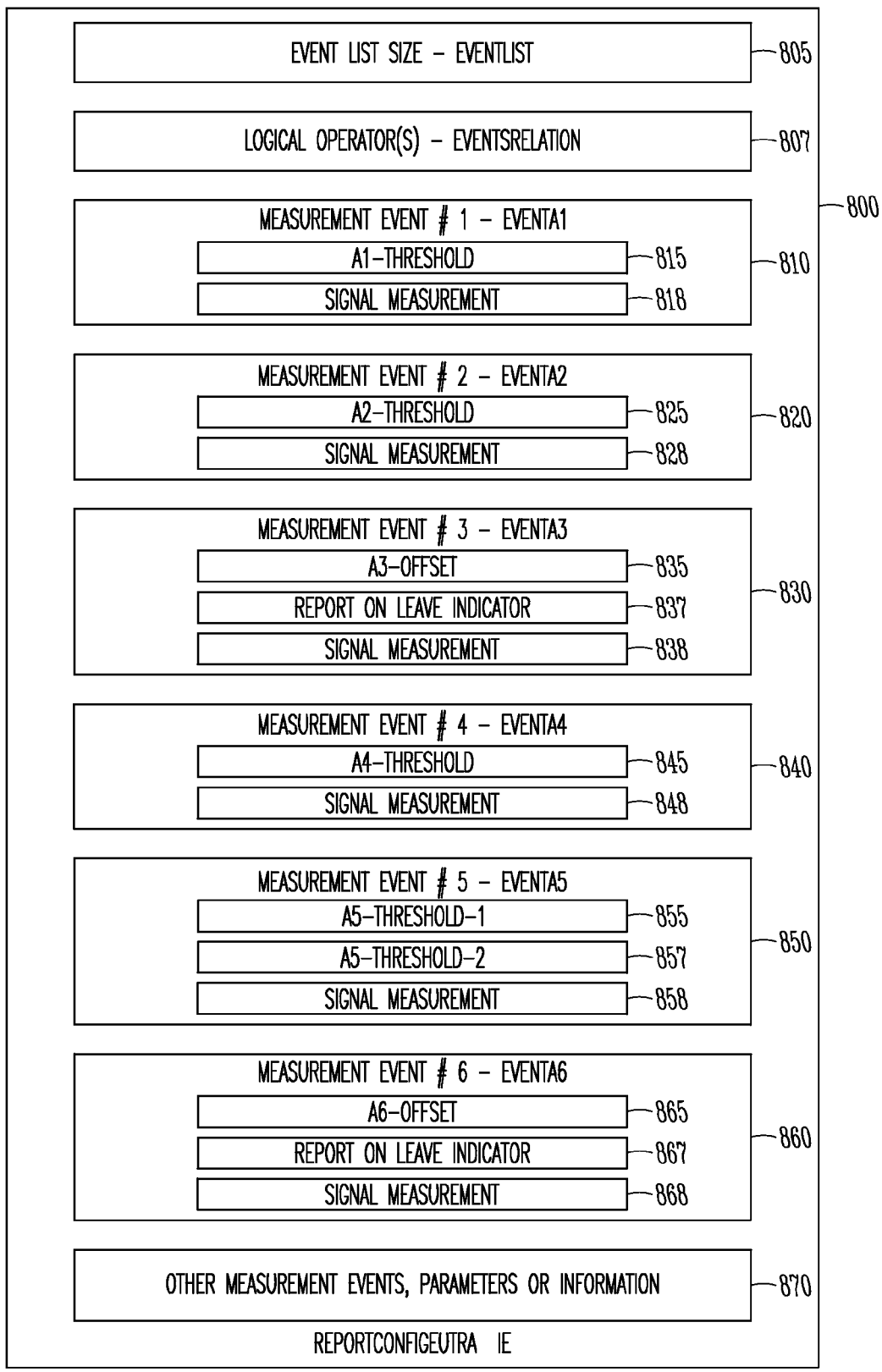
FIG. 8 illustrates another example of a measurement report configuration message in accordance with some embodiments.

FIG. 8 illustrates another example of a measurement report configuration message in accordance with some embodiments. The measurement report configuration message 800 may include an event list size 805 and one or more logical operators 807, which may be similar to the previously described parameters shown in FIG. 6. In addition, any number of measurement events, such as 810, 820, 830, 840, 850, 860, and others, may be used. These measurement events may be similar to the A1-A6 events previously described regarding FIG. 6.

However, as shown in FIG. 8, the example measurement events included in the measurement report configuration message 800 may each include individual signal measurements 818, 828, 838, 848, 858, and 868, which may be used as previously described. That is, for at least some of the measurement events, the occurrence of each measurement event may be related to an individual signal measurements (such as 818, 828, 838, 848, 858, and 868) included in the measurement report configuration message 800.

As an example, the measurement report configuration message 800 may include the A1 event 810 and the A2 event 820, the signal measurement 818 may be an RSRQ, and the signal measurement 828 may be an RSRP. Accordingly, the first measurement event 810 may occur when a measured RSRQ for the serving cell is greater than the a1-Threshold 815 and the second measurement event 820 may occur when a measured RSRP for the serving cell is less than the a2-Threshold 825. Continuing the example, the logical operator 807 may be "logical AND" and a combined measurement event may therefore occur when both the first measurement event 810 and the second measurement event 820 occur. Other measurement events, parameters or information 870 may also be included and may be similar to those previously described regarding FIG. 8.

Figure 9:
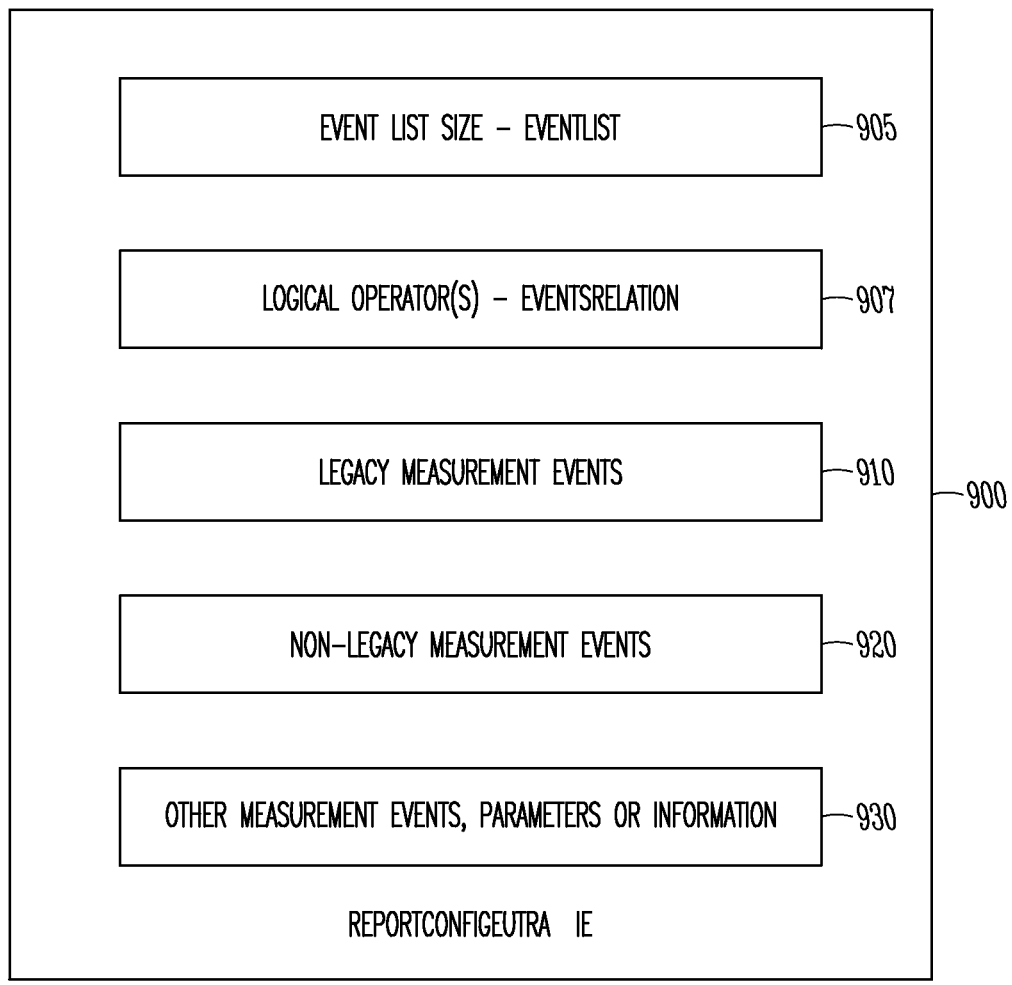
FIG. 9 illustrates another example of a measurement report configuration message in accordance with some embodiments.

FIG. 9 illustrates another example of a measurement report configuration message in accordance with some embodiments. The measurement report configuration message 900 may include an event list size 905 and one or more logical operators 907, which may be similar to the previously described parameters shown in FIG. 6. In addition, any number of legacy measurement events 910 may be included along with any number of non-legacy measurement events 920. That is, the measurement report configuration message 900 may include a first group of measurement events for usage by legacy UEs 102 and a second group of measurement events for usage by non-legacy UEs 102. These measurement events may be similar to the A1-A6 events previously described regarding FIGS. 6-8, and may also be characterized using any of the techniques described in FIGS. 6-8. As an example, the non-legacy measurement events 920 may include events for which individual signal measurements are specified. When the UE 102 is a non-legacy UE 102, the non-legacy events 920 may be used. Legacy UEs 102 may use the legacy measurement events 910, and may or may not even be configured to interpret or use the non-legacy measurement events 920. Accordingly, backward compatibility may be realized.

As an example, a measurement report configuration message may include a first measurement event and a second measurement event. The first measurement event may occur when a difference between an RSRQ of a candidate handover cell and an RSRQ of a serving cell exceeds a first RSRQ threshold. The second measurement event may occur when the RSRQ of the candidate handover cell exceeds a second RSRQ threshold. A combined event may occur when both the first and second measurement events occur. That is, the combined event may be formed or defined according to the "logical AND" operator, which may be included in the measurement report configuration message. In some embodiments, the first and second measurement events may be an A3 event and an A4 event, respectively, in which the A3 event and A4 event may be included in 3GPP or other standards. In some cases, the use of this configuration may provide improved performance over using the A2 event previously described.

Returning to the method 500, at operation 515, measurement events included in the measurement report configuration message may be determined for each candidate handover cell. At operation 520, the combined measurement event for each candidate handover cell may be determined. It should be noted that operations 515 and 520 may be performed separately or jointly as part of any suitable implementation. In addition, the occurrence of the measurement events or the combined measurement event may include an occurrence of such for a time duration. That is, the condition included in the measurement event may need to last for at least the time duration in order to determine that the measurement event has occurred. As an example, a time-to-trigger (TTT) timer parameter of 3GPP or other standards may be used. Accordingly, outliers or temporary conditions related to obstacles or the environment or other factors may be discounted, and the measurement event may focus on more of an average type of value.

At operation 525, a measurement report may be transmitted for a candidate handover cell when the combined measurement event occurs for the candidate handover cell. That is, the report may be transmitted in response to a triggering, at the UE 102, of the combined measurement event for the candidate handover cell. The report may be transmitted to a serving eNB 104 or other eNBs 104. In some embodiments, the report may include values or a history for signal measurement results like those previously described. While the report may be related to a single candidate handover cell, such embodiments are not limiting. The report may include previously described information for multiple candidate handover cells in some embodiments.

At operation 530, a handover message that indicates or instructs a handover to one of the candidate handover cells may be received at the UE 102. The handover message may be transmitted by one of the eNBs 104, such as the eNB 104 of the serving cell. Accordingly, the decision of the eNB 104 to indicate the handover and to transmit the handover message may be performed based at least partly on information included in the measurement report previously described. At operation 535, the UE 102 may exchange one or more handover setup messages with the candidate handover cell. The exchange may take place in response to the reception of the handover message or may take place when the combined measurement event occurs.

It should be noted that previously described embodiments of the measurement report configuration message may be generated at the eNB 104, may be known at the eNB 104, and may be transmitted by the eNB 104. The eNB 104 may receive a measurement report that indicates an occurrence of a combined measurement event at the UE 102 for a candidate handover cell. Previously described embodiments of the combined measurement event may be included in the measurement report or may be determined at the eNB 104 based at least partly on the measurement report. Based on the measurement report and/or the combined measurement event, the eNB 104 may transmit a handover message to the UE 102 that indicates a handover to one of the candidate handover cells or instructs the UE 102 to perform such a handover.

User Equipment (UE) to support inter-frequency handover in a 3GPP LTE network is disclosed herein. The UE may comprise hardware processing circuitry configured to receive, from an Evolved Node-B (eNB), a measurement report configuration message that includes multiple measurement events to be determined at the UE. The hardware processing circuitry may be further configured to transmit a measurement report when a combined measurement event occurs. The combined measurement event may include a combination of the multiple measurement events according to a "logical AND" operator such that the combined measurement event occurs when the multiple measurement events occur. The measurement events may be related to signal measurements performed on one or more signals received at the UE from one or more cells configured for operation in the network.

In some embodiments, each signal measurement may be one of Reference Signal Received Quality (RSRQ) and Reference Signal Received Power (RSRP). In some embodiments, the signals received at the UE may be received from a serving cell and/or from a candidate handover cell. In some embodiments, an occurrence of at least one of the measurement events may be related to a difference between a signal measurement result for the measurement event and a predetermined threshold. In some embodiments, an occurrence of at least one of the measurement events may be related to a difference between signal measurement results for the measurement event and the signal measurement results may be further for a serving cell and a candidate handover cell.

In some embodiments, the measurement report configuration message may further include one or more logical operators for the combination of the multiple measurement events. The logical operators may take on values from a group that includes "logical AND" and "logical OR". The combined measurement event may include a combination of the multiple measurement events according to the "logical AND" operator when the logical operators take on the value of "logical AND". In some embodiments, the group of candidate logical operators may further include "logical NAND" and "logical NOR" and "logical NOT" operators.

In some embodiments, an occurrence of at least one of the measurement events may be related to a difference between an RSRQ and an RSRQ threshold or a difference between the RSRQ and another RSRQ. An occurrence of at least one of the measurement events may be related to a difference between an RSRP and an RSRP threshold or a difference between the RSRP and another RSRP. In some embodiments, for at least some of the measurement events, the occurrence of each measurement event may be related to an individual signal measurement included in the measurement report configuration message and each individual signal measurement may be one of RSRQ and RSRP.

In some embodiments, the handover may occur between a macro cell that operates in a first frequency band and a micro cell that operates in a second different frequency band. In some embodiments, the occurrence of the combined measurement event may include occurrences of the measurement events for a time duration according to a time-to-trigger (TTT) timer parameter. In some embodiments, the UE may be a non-legacy UE and the measurement report configuration message may include a first group of measurement events for usage by legacy UEs and a second group of measurement events for usage by non-legacy UEs.

In some embodiments, a first measurement event may occur when a difference between an RSRQ of a candidate handover cell and an RSRQ of a serving cell exceeds a first RSRQ threshold. A second measurement event may occur when the RSRQ of the candidate handover cell exceeds a second RSRQ threshold. The occurrence of the combined measurement event may include the occurrences of the first measurement event and second measurement event. In some embodiments, the first measurement event may be an A3 event and the second measurement event may be an A4 event.

A method of inter-frequency handover at a User Equipment (UE) operating in a 3GPP LTE network is also disclosed herein. The method may include receiving a measurement report configuration message that includes multiple measurement events to be determined at the UE. The method may further include monitoring for a combined measurement event related to a joint occurrence of the measurement events. The measurement events may be based at least partly on signal measurements at the UE for a serving cell or for a candidate handover cell. The method may further include transmitting a measurement report when the combined measurement event occurs and exchanging one or more handover setup messages with the candidate handover cell when the combined measurement event occurs. In some embodiments, the occurrence of the combined measurement event may include occurrences of the measurement events for a time duration according to a time-to-trigger (TTT) timer parameter.

In some embodiments, the measurement report configuration message may include an event relationship operator to indicate that the combined measurement event is related to the joint occurrence of the measurement events according to a "logical AND" operator. The method may further include receiving, from the serving eNB, a handover message that instructs the UE to handover to the candidate handover cell. In some embodiments, the occurrence of each measurement event may be based on a Reference Signal Received Quality (RSRQ) or Reference Signal Received Quality (RSRP) value. In some embodiments, a first measurement event may occur when a difference between an RSRQ of a candidate handover cell and an RSRQ of a current cell exceeds a first RSRQ threshold. A second measurement event may occur when the RSRQ of the candidate handover cell exceeds a second RSRQ threshold. The occurrence of the combined measurement event may include the occurrences of the first measurement event and second measurement event.

A non-transitory computer-readable storage medium that stores instructions for execution by one or more processors to perform operations for inter-frequency handover is also disclosed herein. The operations may configure the one or more processors to receive, from an Evolved Node-B (eNB), a measurement report configuration message that includes multiple measurement events to be determined at the UE and transmit a measurement report when a combined measurement event occurs. In some embodiments, the combined measurement event may include a combination of the multiple measurement events according to a "logical AND" operator such that the combined measurement event occurs when the multiple measurement events occur. In some embodiments, the measurement events may be related to signal measurements performed on one or more signals received at the UE from one or more cells configured for operation in the network.

In some embodiments, each signal measurement may be one of Reference Signal Received Quality (RSRQ) and Reference Signal Received Power (RSRP). The signals received at the UE may be received from a serving cell or from a candidate handover cell. In some embodiments, a first measurement event may be an A3 event that occurs when a difference between an RSRQ of the candidate handover cell and an RSRQ of the serving cell exceeds a first RSRQ threshold. A second measurement event may be an A4 event that occurs when the RSRQ of the candidate handover cell exceeds a second RSRQ threshold. The occurrence of the combined measurement event may include the occurrences of the first measurement event and second measurement event.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. User Equipment (UE) to support inter-frequency handover in a 3GPP LTE network, the UE comprising hardware processing circuitry configured to:
   decode, from an Evolved Node-B (eNB), a measurement report configuration message that comprises multiple measurement events to be determined at the UE, an event list size that describes at least one of how many or which measurement events are included in the measurement report configuration message, at least one logical operator, and one of a universal signal measurement to be measure for the measurement events or a signal measurement to be measured associated with the measurement events on a per-measurement event basis such that the signal measurement to be measured for a particular measurement event is independent of the signal measurement to be measured for another measurement event, the signal measurements performed on one or more signals received at the UE from one or more cells configured for operation in the network: and generate a measurement report when a combined measurement event occurs, wherein the combined measurement event is triggered when a combination of the multiple measurement events occurs in a manner indicated by the at least one logical operator.

2. The UE according to claim 1, wherein the at least one logical operator comprises a "logical AND" operator and the combined measurement event includes a combination of the multiple measurement events according to the "logical AND" operator such that the combined measurement event is triggered when all the multiple measurement events occur, and wherein each signal measurement is one of Reference Signal Received Quality (RSRQ) and Reference Signal Received Power (RSRP).

3. The UE according to claim 2, wherein the signals received at the UE are received from a serving cell and/or from a candidate handover cell.

4. The UE according to claim 2, wherein an occurrence of at least one of the measurement events is related to a difference between a signal measurement result for the measurement event and a predetermined threshold.

5. The UE according to claim 2, wherein an occurrence of at least one of the measurement events is related to a difference between signal measurement results for the measurement event, the signal measurement results further for a serving cell and a candidate handover cell.

6. The UE according to claim 2, wherein:

the at least one logical operators take on values from a group that includes "logical AND" and "logical OR"; and the combined measurement event includes a combination of the multiple measurement events according to the "logical AND" operator when the logical operators take on the value of "logical AND".

7. The UE according to claim 2, wherein the group of candidate logical operators further includes "logical NAND" and "logical NOR" and "logical NOT" operators.

8. The UE according to claim 2, wherein:

an occurrence of at least one of the measurement events is related to a difference between an RSRQ and an RSRQ threshold or a difference between the RSRQ and another RSRQ; and an occurrence of at least one of the measurement events is related to a difference between an RSRP and an RSRP threshold or a difference between the RSRP and another RSRP.

9. The UE according to claim 2, wherein:

for at least some of the measurement events, the occurrence of each measurement event is related to an individual signal measurement included in the measurement report configuration message; and each individual signal measurement is one of an RSRQ and an RSRP.

10. The UE according to claim 1, wherein the handover occurs between a macro cell that operates in a first frequency band and a micro cell that operates in a second different frequency band.

11. The UE according to claim 1, wherein the occurrence of the combined measurement event includes occurrences of the measurement events for a time duration according to a time-to-trigger (TTT) timer parameter.

12. The UE according to claim 2, wherein:

the UE is a non-legacy UE; and the measurement report configuration message includes a first group of measurement events for usage by legacy UEs and a second group of measurement events for usage by non-legacy UEs, the first and second groups being independent.

13. The UE according to claim 2, wherein:

a first measurement event occurs when a difference between an RSRQ of a candidate handover cell and an RSRQ of a serving cell exceeds a first RSRQ threshold;

a second measurement event occurs when the RSRQ of the candidate handover cell exceeds a second RSRQ threshold; and the occurrence of the combined measurement event includes the occurrences of the first measurement event and second measurement event.

14. The UE according to claim 13, wherein the first measurement event is an A3 event and the second measurement event is an A4 event.

15. A method of inter-frequency handover at a User Equipment (UE) operating in a 3GPP LTE network, comprising:

receiving a measurement report configuration message that comprises multiple measurement events to be determined at the UE, an event list size that describes at least one of how many or which measurement events are included in the measurement report configuration message, at least one logical operator, and one of a universal signal measurement to be measured for the measurement events or a signal measurement to be measured associated with the measurement events on a per-measurement event basis such that the signal measurement to be measured for a particular measurement event is independent of the signal measurement to be measured for another measurement event, the signal measurements performed on one or more signals received at the UE from one or more cells configured for operation in the network; and monitoring for a combined measurement event related to a joint occurrence of the measurement events, the measurement events based at least partly on the signal measurements at the UE for a serving cell or for a candidate handover cell;

transmitting a measurement report when the combined measurement event occurs in a manner indicated by the at least one logical operator; and exchanging one or more handover setup messages with the candidate handover cell when the combined measurement event occurs.

16. The method according to claim 15, wherein the at least one logical operator comprises a "logical AND" operator and the measurement report configuration message includes an event relationship operator to indicate that the combined measurement event is related to the joint occurrence of the measurement events according to the "logical AND" operator.

17. The method according to claim 15, further comprising receiving, from the serving eNB, a handover message that instructs the UE to handover to the candidate handover cell.

18. The method according to claim 15, wherein the occurrence of each measurement event is based on a Reference Signal Received Quality (RSRQ) or Reference Signal Received Quality (RSRP) value.

19. The method according to claim 18, wherein:
a first measurement event occurs when a difference between an RSRQ of a candidate handover cell and an RSRQ of a current cell exceeds a first RSRQ threshold;
a second measurement event occurs when the RSRQ of the candidate handover cell exceeds a second RSRQ threshold; and
the occurrence of the combined measurement event includes the occurrences of the first measurement event and second measurement event.

20. A non-transitory computer-readable storage medium that stores instructions for execution by one or more processors to perform operations for inter-frequency handover, the operations to configure the one or more processors to:
decode, from an Evolved Node-B (eNB), a measurement report configuration message that comprises multiple measurement events to be determined at the UE, an event list size that describes at least one of how many or which measurement events are included in the measurement report configuration message, at least one logical operator, and one of a universal signal measurement to be measured for the measurement events or a signal measurement to be measured associated with the measurement events on a per-measurement event basis such that the signal measurement to be measured for a particular measurement event is independent of the signal measurement to be measured for another measurement event, the signal measurements performed on one or more signals received at the UE from one or more cells configured for operation in the network; and
generate a measurement report when a combined measurement event occurs,
wherein the combined measurement event is triggered when a combination of the multiple measurement events occurs in a manner indicated by the at least one logical operator.

21. The non-transitory computer-readable storage medium according to claim 20, wherein:
each signal measurement is one of Reference Signal Received Quality (RSRQ) and Reference Signal Received Power (RSRP); and
the signals received at the UE are received from a serving cell or from a candidate handover cell.

22. The non-transitory computer-readable storage medium according to claim 21, wherein:
a first measurement event is an A3 event that occurs when a difference between an RSRQ of the candidate handover cell and an RSRQ of the serving cell exceeds a first RSRQ threshold;
a second measurement event is an A4 event that occurs when the RSRQ of the candidate handover cell exceeds a second RSRQ threshold; and
the occurrence of the combined measurement event includes the occurrences of the first measurement event and second measurement event.

23. The UE according to claim 1, wherein, in the measurement report configuration message, at least one of the measurement events comprises an associated function and at least one of the measurement events is free from the associated function.

24. The UTE according to claim 23, wherein the associated function comprises transmission of a measurement report such that at least one of the measurement events is free from being used independently to trigger the transmission.

25. The UE according to claim 1, wherein the event list size describes how many measurement events are included in the measurement report configuration message and each measurement event in the measurement report configuration message independently comprises a signal measurement to be measured.

* * * * *

UNITED STATES PATENT AND TRADEMARK OFFICE
CERTIFICATE OF CORRECTION

PATENT NO. : 9,560,560 B2  
APPLICATION NO. : 14/578961  
DATED : January 31, 2017  
INVENTOR(S) : Yiu et al.

Page 1 of 1

It is certified that error appears in the above-identified patent and that said Letters Patent is hereby corrected as shown below:

In the Claims

In Column 15, Line 5, in Claim 1, delete "measure" and insert --measured-- therefor In Column 15, Line 13, in Claim 1, delete "network:" and insert --network;-- therefor In Column 15, Line 44, in Claim 6, delete "operators" and insert --operator-- therefor In Column 15, Line 51, in Claim 7, delete "claim 2," and insert --claim 6,-- therefor In Column 18, Line 28, in Claim 24, delete "UTE" and insert --UE-- therefor Signed and Sealed this  
Fourth Day of June, 2019

Andrei Iancu  
*Director of the United States Patent and Trademark Office*